April 9, 1968 R. C. WICKLUND 3,376,876

ARTICLE FOR DENTAL HYGIENE

Filed Feb. 24, 1965

INVENTOR
ROY C. WICKLUND
BY Robert C Baker
ATTORNEY

United States Patent Office 3,376,876
Patented Apr. 9, 1968

3,376,876

ARTICLE FOR DENTAL HYGIENE

Roy C. Wicklund, Box 2, Alexandria, Minn. 56308

Filed Feb. 24, 1965, Ser. No. 435,092
6 Claims. (Cl. 132—92)

ABSTRACT OF THE DISCLOSURE

A container-dispenser and holding tool for payout of dental floss, in the form of a monolithic structure free of screw-threaded parts, having a handle containing a recess for a payout winding of dental floss, and a head with spaced apart stub-prongs equipped with dental floss holding means including an annular serrated friction surface, preferably in an annular groove, plus a pinching recess intersecting the annular groove and bifurcating each of the stub-prongs.

This invention relates to a new article of manufacture for use in improving dental hygiene. More particularly, the invention relates to a container-dispenser and holding-tool for strand-like material such as dental floss.

It is acknowledged that dental floss holding tools are old. Insofar as I am aware, however, those heretofore known have been relatively complex in design, expensive to manufacture, and impractical to use as disposable container-dispensers for marketing dental floss in commerce. Indeed, holding tools having spaced-apart prongs to hold a strand of dental floss in taut condition for use in cleaning teeth are even old and well-known; but tools incorporating this principle of design have been formed of several parts which must be screw-threaded together, or have relied upon complex and expensive-to-manufacture screw-tensioning means to gain tautness for the dental floss, or have had irregularly-shaped projections which inadvertently cause damage to teeth or lips or tongue during use of the tool, or have been fundamentally ineffective to hold dental floss in a taut condition as necessary for the teeth-cleaning operation.

The present invention provides the art with an improved type of simplified implement for holding dental floss in a taut condition for the teeth-cleaning operation. Advantageously, the device or article of the present invention is free of screw-threaded parts. It is simple to operate and maintain in a clean state. It is in the form of a container-dispenser suitable for use as a disposable container for selling dental floss in commerce. It is extraordinarily simple in design as compared to prior art teeth-cleaning implements, and is economical to mass produce by techniques such as the injection molding of organic plastic material. Even the dental floss cutting means of the invention may be formed during an injection molding step, as by pre-positioning a cutting blade in the mold and then injecting the plastic about portions of the blade to mount it and hold it firmly in the recessed location to be described.

The details of my invention will be described by reference to a drawing made a part hereof, wherein.

Figure 1:
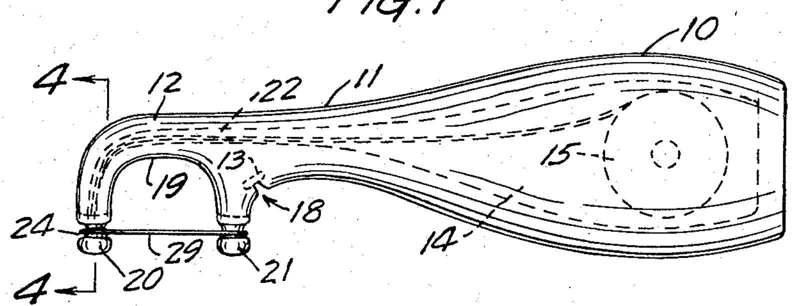
FIGURE 1 is a side elevation of the container-dispenser and holding-tool of the invention, with the internal configuration and contents shown by broken lines.

Referring to the drawing, the device hereof comprises a handle portion 10, a neck portion 11, and a head portion 12. These portions of the device are quite customarily of the same material, suitably a durable metal where professional dental use is contemplated, but preferably an organic plastic material where a disposable container-tool for home usage is contemplated. The organic plastic should be of non-tacky character and of the relatively rigid but snap-yieldable structural type (e.g., a thermoplastic plastic such as, for example, polystyrene and polyethylene, or a thermosetting plastic such as, for example, a phenol aldehyde, an alkyd-type, or an epoxy). Snap-yieldable means that the plastic, in the form of a cover, yields slightly under pressure and snaps back into place when the pressure is released. Preferably the plastic selected is thermoplastic, as the thermoplastic plastics are generally more economical. The handle, neck and head of the device are integrally united together as a monolithic unit; and, as just noted, the unit is preferably formed in its entirely out of organic plastic, with the possible exception of the knife blade 13 in the neck of the device. Even that blade may be formed of hard plastic; but frequently a small piece of metal with a sharp blade edge is preferred.

The handle portion of the apparatus will be noted to have a recess 14 therein adapted to receive within it a payout winding 15 (e.g. a spool) or like reservoir of a relatively long length of strand-like material such as dental floss. The axis of this payout winding may be located transversely to the length of the handle portion 10, as illustrated in the drawing, or it may be located in other orientation within the handle, even an orientation essentially aligned with the length of the handle portion. Ends of a shaft holding a payout winding of material may be held within journaling recesses 16 and 17 in the body of the handle 10. If desired, the journaling recesses may be tight fitting to cause resistance to rotation of the noted shaft, and thereby obviate wastage of dental floss as might occur were it so easily removed as to rapidly unwind in an uncontrolled manner; or if desired, reliance may be placed alone on the normal or ordinary tendency of dental floss to resist unraveling when it is in roll or wound-up form.

Next is the neck 11, and this neck 11 may be slender as illustrated or thick, even as thick (or large) in diameter or cross-section as the handle portion 10. The fact is that the neck may appear indistinct from the handle portion in variants of the device. It is merely the part immediately adjacent the head 12 and immediately adjacent the handle 10, being the transitional or the connecting link between the handle and head respectively. Thus, it may be looked upon as being part head or part handle in character; and in this sense, the neck may in some embodiments give the appearance of even lacking the physical characteristics of the transistional function.

Preferably located within what is termed the neck section is the cutting edge or cutter 13, although other locations for the cutter may be useful. The cutter 13 is not exposed. It is so recessed that it cannot be touched in any significant cutting sense with one's tongue or lips or fingers. It is within a wall of the tool and within a slit recess 18 having a slit width just great enough to permit convenient sliding or slipping of a strand of dental floss therein but insufficiently wide to receive a human finger, lip or tongue. Preferably, as illustrated, the slit 18 is approximately transverse to the axis of the neck portion (or handle portion); and the cutting blade 13 is recessed transversely across the width of the slit and within it, usually at a depth of at least about $\frac{1}{16}$-inch, such that no part of the blade is exposed. The blade may, however, be located substantially transversely in a slit extending parallel to the axis of the handle 10 (e.g., in a yoke section transverse to the handle).

The head 12 has a yoke section 19 which joins or connects two spaced-apart essentially parallel stub-prongs 20 and 21 extending in the same direction from the yoke section. These prongs are reasonably close together, but spaced apart sufficiently to accommodate, with convenient and free clearance, the width of the usual human tooth, including molars, therebetween. Thus, the prongs should be at least about ⅜-inch or even ½-inch apart, and may suitably be as much as about one inch apart. An excellent spacing is about ¾-inch. The prongs may project in any outward direction from the head end of the tool so long as they are essentially parallel in their projection. For example, they may project laterally (i.e., transversely) from a yoke section oriented substantially parallel with (or even in line with) the axis (i.e., the center line along) of the handle portion. They may project laterally from a yoke section oriented at an angle to the axis of the handle. An interesting variation convenient to use is one where the yoke section extends at an angle to the axis (or the center line) of the handle portion, suitably between about 10° and 50° from the parallel or "in line" position for the yoke section, and the prongs project from the yoke section in a direction substantially perpendicular to a plane through the yoke section and a hypothetical position for the same in line with the axis of the handle. A still further variation convenient to use and economical for the container-dispenser function is one where the yoke section is transverse to a line through the axis of the handle. Here the yoke becomes somewhat analogous to the end of the handle section. In a sense, the end of the handle section, the neck, and the yoke "fuse" together so that, even though the function of each is retained, the physical part so presented appears to lack the more complex structural details ordinarily associated with a part or parts capable of such varied functional performance. It is in this embodiment that the possibility exists to orient the essentially-parallel projecting stub-prongs so that they project in a direction essentially parallel with the axis of the handle itself. Other directions of projection for the prongs are also possible in this embodiment; and usually, for this embodiment, the direction of projection or protrusion will either be substantially parallel with the axis through the handle or offset therefrom at an angle up to about 90° or possibly even 100°.

Each stub-prong 20 and 21 is at least ¼-inch in length (measured from the nearest exposed surface of the yoke bridging between them), preferably about ½-inch to about ¾-inch in length. In cross-section, these prongs are about ⅛-inch in diameter (or transverse dimensions) up to about ¼-inch or possibly ⅜-inch. The circumference of the outermost portion of the stub-prongs, that is, the circumference of the last ¼ (or possibly ⅓) of the prong is provided with a band of serrated friction surfacing (suitably formed by grooves in the mold used in injection molding); and this outermost portion of the circumference of the prongs is also preferably equipped with an annular groove 24 (for receiving wound-about dental floss) in the area of the band of serrated surfacing and preferably having serrated surfacing itself. This groove 24 is most ideally placed nearest the edge of the band of serrations opposite the outermost end of the prongs. Preferably both stub-prongs are similarly appointed; but in every case, at least one, especially the stub-prong furthest from the exit of the strand-like material from the article, is serrated as described.

Finally the tip of each of the stub-prongs is bifurcated. This state is inherent in that the tip of each prong is provided with a slit dividing the tip into two parts. The slit may extend for about ¼ to about ⅓ (or even more, if desired) of the length of the prong from its outermost end. In usual practice the slit depth from the end of each prong is approximately as great, but usually no greater than, the width of the band of friction surface on the circumference of the outermost portion of the prongs (i.e., usually no greater than ¼ or ⅓ the length of the prong). The character of these slits is most significant. The slit gradually and rapidly diminishes in width as it progresses from the outermost tip portion of the prong toward the yoke. The width becomes pinchingly small quickly, preferably at least within the outermost ⅙ or ⅛ part of the prong. It is so small at this point as well as the rest of the way to and including the internal terminus of the slit that the bifurcated portions, one on each side of the slit, serve to pinch strand material such as dental floss drawn therebetween. In essence, the slit is a pinching slit or recess within which dental floss may be lodged against dislodgement. In combination with the serrated friction surfaces, the slit serves to hold dental floss against movement during teeth cleaning operations.

Figure 2:
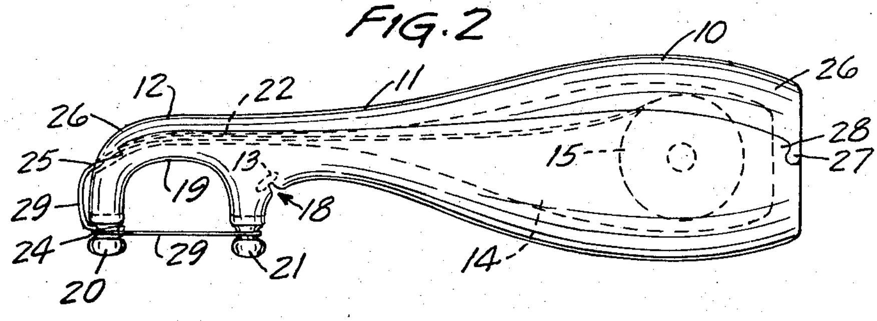
FIGURE 2 is a side elevation of a modified embodiment of the invention, also with its internal configuration and contents shown by broken lines.
Figure 4:
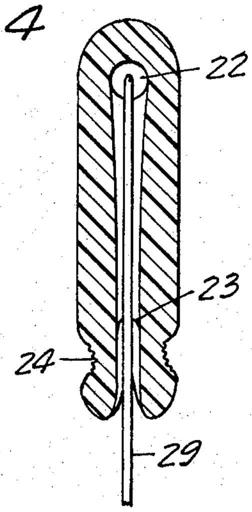
FIGURE 4 is an enlarged cross section on line 4—4 of FIGURE 1.

As illustrated in FIGURE 1, the recess 14 extends much as a conduit 22 through neck 11 and head 12 to terminate as an opening 23 in the slit of the end portion of prong 20 (or alternately, the end portion of prong 21). The details of opening 23 and conduit path 22 in head 12 are shown in FIGURE 4. FIGURE 2 illustrates an alternative to emptying conduit 22 into the end of prong 20 or 21. As there illustrated, conduit 22 empties through opening 25 in head 12. Shown in FIGURE 2 is a design which has a clip-on or snap-on removable cover 26 (with part 27 mated to part 28 in hooking or clip-on fashion). That cover, however, is not an essential part of, and its separateness does not detract from, the monolithic configuration of the merged parts (the basic parts of the handle, neck and head). It does permit replacement or inspection of the contents within recess 14, whereas the article of FIGURE 1 is free of a cover, or with its cover sealed in place, precluding inspection of contents except by damaging the device. Sealed units as in FIGURE 1 are especially desirable for their improved sealed hygienic character.

It is to be recognized that the size of the recess 14, illustrated as the hollow cavity in handle 10 in FIGURE 1, may vary depending upon the size desired for the handle itself or the amount of dental floss to be contained therein.

Generally, the diameter (if round, as is preferred) or maximum lateral dimension for the bulb of the handle 10 will be about one inch up to about 1½ or even 2 or 2½ inches, with the length of the handle varying from a lower minimum of possibly one inch or 1½ inches, up to about 2½ or 3 or even 4 or 5 inches. Thus, it should be recognized that the handle for this tool is ordinarily somewhat shorter than the apparent length of the handle for other tools of like usage as known heretofore. In fact, the length of the entire tool of this invention is somewhat shorter than the apparent total length of prior art tools. This tool may be as short as about 2 inches, but practical usage suggests a minimum of 3 inches as preferable. Although lengths for the tool in excess of 6 or 8 inches are possible, the usual maximum practical upper limits of length is about 6 inches or possibly 8 inches. Lengths of about 3 inches up to about 5 inches are considered most desirable for compactness together with performance of function.

Figure 3:
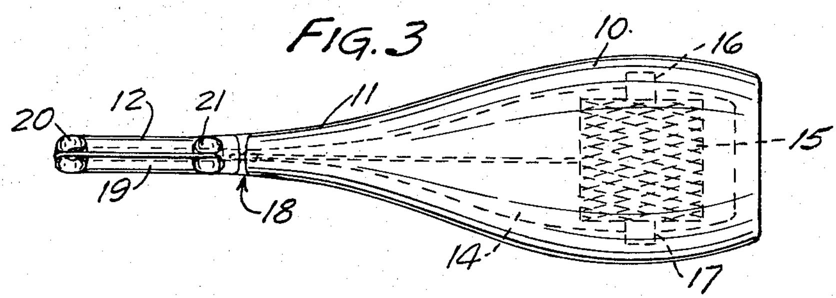
FIGURE 3 is a bottom view of the article in FIGURE 1 (and, for the most part, representative also of the bottom view of the article in FIGURE 2), with its internal configuration and contents shown by broken lines.

An interesting feature of the article is its flat base illustrated at the right of FIGURES 1, 2 and 3. During storage of the article in a medicine cabinet or the like, it may be placed on its flat base to rest in a stable upright position.

The simplicity of the article and its ease of use are two primary benefits provided by the invention. Its simplified construction has been covered. Its ease of use is illustrated by the fact that dental floss 29 is drawn through opening 23 or 25 (depending on specific design chosen) from the payout roll 15, drawn to and wrapped around the serrated friction end (usually in the grooved portion) of the most accessible prong, passed through the pinching slit of that prong (which may also be done before wrapping it around that prong), drawn tightly to the other prong, wrapped around it, and drawn tightly through the slit of that prong, with any excess floss cut off by cutter 13 by passing the floss into the cutting slit 18 preferably before affixing the useful portion between the prongs in taut condition for use in removing foreign matter lodged between teeth.

That which is claimed is as follows:

1. As a new article of manufacture: a container-dispenser and holding-tool adapted to pay out strand-like material and hold the same in an operable taut condition for hygienic teeth-cleaning operations, said article being free of screw-threaded parts and comprising a head portion and a handle portion of the same material and integrally united together as a monolithic unit; said article having within it a recess with a payout supply of strand-like material therein; said head portion consisting essentially of a yoke section joining two spaced-apart bifurcated stub-prongs; means for holding said strand-like material in taut condition between said stub-prongs, said means comprising a band of serrated friction surface extending annularly about the circumference of the outermost portion of at least one of said stub-prongs in an annular groove about the circumference thereof near but spaced from the tip of the outermost portion thereof, and a pinching recess at the tip of the outermost portion of said one stub-prong, said pinching recess being formed by a slit of gradually diminishing width into the stub-prong at the tip portion of the body of said stub-prong, whereby said stub-prong is bifurcated, said pinching recess being adapted to pinchingly receive strand-like material drawn into it; means on the exterior part of said article for instantaneously cutting said strand-like material; a passage extending from and connecting the recess of said article to the exterior of said article, such that the strand-like material held within said article can be extended through said passage to the exterior of said article and fixed upon the stub-prongs thereof in taut condition between said stub-prongs and therefore ready for use in hygenic cleaning operations.

2. As a new article of manufacture: a container-dispenser and holding-tool adapted to pay out strand-like material and hold the same in an operable taut condition for hygienic teeth-cleaning operations, said article being free of screw threaded parts and comprising a head portion and a handle portion of the same material and integrally united together as a monolithic unit; said article having within it a recess containing a payout supply of strand-like material; said head portion consisting essentially of a yoke section joining two spaced-apart stub-prongs, each of said stub-prongs being bifurcated by a pinching slit of gradually diminishing width extending thereinto from the tip portion thereof, each said pinching slit being no greater in depth than one-third of the length of the stub-prong and being adapted to receive the strand-like material and pinchingly hold it, each of said stub-prongs being provided with an annular groove having a band of serrated friction surface extending about the circumference thereof near but spaced from the tip portion thereof, each of said grooves being intersected by said pinching slits of said stub-prongs, said friction-surfaced grooves being adapted to frictionally receive an annular wrapping of the strand-like material thereabout and further being adapted to serve in combination with the pinching slits of said stub-prongs, said friction-surfaced grooves being ment from said stub-prongs; means on the exterior part of said article for instantaneously cutting said strand-like material; a passage extending from and connecting the recess of said article to the exterior of said article, such that the strand-like material held within said article can be extended through said passage to the exterior of said article and fixed upon the stub-prongs thereof in taut condition between said stub-prongs and therefore ready for use in hygienic cleaning operations.

3. The article of claim 2 in which the means for instantaneously cutting the strand-like material comprises a slot having a cutting edge recessed therein and oriented transversely to the opening of the slot.

4. The article of claim 2 having, in addition, an opening for access into the recess containing the payout supply of strand-like material, and a cover over said opening.

5. The article of claim 2 in which the recess containing the payout supply of strand-like material is sealed against access from the exterior except by damaging the article.

6. As a new article of manufacture: a container-dispenser and holding-tool adapted to pay out the strand-like material and hold the same in an operable taut condition for hygienic teeth-cleaning operations, said article being free of screw-threaded parts and comprising a head portion, a neck portion, and a handle portion of the same material and integrally united together as a monolithic unit; said handle portion being equipped with a recess adapted to receive a payout winding of strand-like material, a payout winding of strand-like material in said recess; said head portion consisting essentially of a yoke section joining two spaced-apart essentially-parallel stub-prongs extending in the same direction therefrom, a band of serrated friction surface extending annularly in a groove about the circumference of the outermost portion of each of said stub-prongs, the tip of the outermost portion of each of said stub-prongs being bifurcated by a pinching recess intersecting the annular groove thereof, each of said pinching recesses extending thereinto toward the yoke of said head portion, said serrated friction surfaces being adapted to obstruct slippage of strand-like material wrapped therearound and said pinching recesses being adapted to pinchingly receive strand-like material drawn thereinto, thereby serving in combination with the serrated friction surface of each stub-prong to hold said strand-like material against dislodgment from said stub-prongs; a slot in the neck of said article and transversely to the axis through said neck, with a knife recessed within the opening of said slot and oriented transversely to the opening thereof such that the cutting edge of the knife is inaccessible from the exterior surface of said article except through said slot but is available for instantaneous cutting of strand-like material slipped into said slot and therefore against said knife edge; a passage extending from and connecting the recess of said handle portion to the outermost portion of one of said stub-prongs, such that strand-like material on the order of dental floss held within said handle portion on a payout winding can be extended through said passage to the exterior of said article and fixed between the stub-prongs thereof in taut condition for use in hygienic cleaning operations.

References Cited

UNITED STATES PATENTS

| | | | |
|---|---|---|---|
| 1,287,926 | 12/1918 | Ecqubert | 132—92.1 |
| 1,623,231 | 4/1927 | Bowling et al. | 132—92 |
| 1,180,620 | 4/1916 | Stuart | 132—92 |
| 1,879,074 | 9/1932 | Cammack | 132—92 |
| 3,094,996 | 6/1963 | Lewis | 132—72 |

LOUIS G. MANCENE, *Primary Examiner.*

G. E. McNEILL, *Assistant Examiner.*

UNITED STATES PATENT OFFICE

CERTIFICATE OF CORRECTION

Patent No. 3,376,876 April 9, 1968

Roy C. Wicklund

It is certified that error appears in the above identified patent and that said Letters Patent are hereby corrected as shown below:

Column 4, line 59, "limits" should read -- limit --. Column 5, line 46, "screw threaded" should read -- screw-threaded --; line 66, "said stub-prongs, said friction-surfaced grooves being" should read -- said stub-prongs to hold strand-like material against move- --.

Signed and sealed this 23rd day of September 1969.

(SEAL)
Attest:

Edward M. Fletcher, Jr.
Attesting Officer

WILLIAM E. SCHUYLER, JR.
Commissioner of Patents